United States Patent
Tobler et al.

(10) Patent No.: US 12,479,000 B2
(45) Date of Patent: *Nov. 25, 2025

(54) DENSE-PHASE POWDER PUMP WITH PINCH VALVE AND PINCH VALVE

(71) Applicant: GEMA SWITZERLAND GMBH, St. Gallen (CH)

(72) Inventors: Roger Tobler, Gossau (CH); Marco Sanwald, Abtwil (CH)

(73) Assignee: GEMA SWITZERLAND GMBH, Gossau (CH)

( * ) Notice: Subject to any disclaimer, the term of this patent is extended or adjusted under 35 U.S.C. 154(b) by 90 days.

This patent is subject to a terminal disclaimer.

(21) Appl. No.: 18/577,682

(22) PCT Filed: Jul. 5, 2022

(86) PCT No.: PCT/EP2022/068611
§ 371 (c)(1),
(2) Date: Jan. 8, 2024

(87) PCT Pub. No.: WO2023/280868
PCT Pub. Date: Jan. 12, 2023

(65) Prior Publication Data
US 2024/0316591 A1    Sep. 26, 2024

(30) Foreign Application Priority Data
Jul. 9, 2021  (DE) .......................... 102021117797.9

(51) Int. Cl.
*F04B 53/10* (2006.01)
*B05B 7/14* (2006.01)
(Continued)

(52) U.S. Cl.
CPC ........ *B05C 11/1026* (2013.01); *B05B 7/1459* (2013.01); *B65G 53/28* (2013.01);
(Continued)

(58) Field of Classification Search
CPC . B05B 7/1459; B05C 1/1026; B05C 11/1026; F04B 43/08; F04B 53/10;
(Continued)

(56) References Cited

U.S. PATENT DOCUMENTS

2006/0093442 A1* 5/2006 Kleineidam .......... B05B 12/006
406/10
2008/0203001 A1   8/2008 Doig
(Continued)

FOREIGN PATENT DOCUMENTS

DE    202006015697 U1   3/2007
DE    102007006764 B3   4/2008
(Continued)

OTHER PUBLICATIONS

German Office Action Dated Dec. 15, 2021, for corresponding German Application No. 102021117797.9.
(Continued)

*Primary Examiner* — Kenneth Rinehart
*Assistant Examiner* — Jonathan J Waddy
(74) *Attorney, Agent, or Firm* — Kinney & Lange, P.A.

(57) ABSTRACT

A dense-phase powder pump for conveying powder-type materials, in particular coating powder, includes at least one powder conveying chamber with a filter element that has at least regions thereof accommodated in a casing body and at least one pinch valve that is or can be connected to an end region of the powder conveying chamber. In particular, the pinch valve includes a valve element with at least regions that are sleeve-like, wherein the peripheral wall thereof can be squeezed together transverse to the valve element longitudinal axis in order to change the through-flow cross-section, and also includes a substantially tubular support structure, in which at least regions of the valve element are accommodated, wherein the support structure consists of (Continued)

multiple shell elements which are arranged one after another around the peripheral wall in the peripheral direction of the peripheral wall of the valve element, each having an arched cross-section, and which are placed on the outside of the valve element in a radial direction relative to the valve element longitudinal axis.

11 Claims, 4 Drawing Sheets

(51) Int. Cl.
*B05C 11/10* (2006.01)
*B65G 53/28* (2006.01)
*F04B 53/20* (2006.01)
*F16K 7/07* (2006.01)

(52) U.S. Cl.
CPC ............ *F04B 53/1075* (2013.01); *F16K 7/07* (2013.01); *F04B 53/20* (2013.01); *Y10T 137/85978* (2015.04)

(58) Field of Classification Search
CPC ........ F04B 53/1075; F04B 53/20; F16K 7/04; F16K 7/07; F16K 7/075; Y10T 137/85978; Y10T 137/0441; B65G 53/28
USPC ..................................... 137/565.01; 251/4, 5
See application file for complete search history.

(56) References Cited

U.S. PATENT DOCUMENTS

| | | | | |
|---|---|---|---|---|
| 2010/0034600 A1* | 2/2010 | Sanwald | ............... | B05B 7/1472 406/28 |
| 2014/0044578 A1* | 2/2014 | Sanwald | ............... | B05B 7/1459 417/559 |
| 2016/0052000 A1* | 2/2016 | Mauchle | ............... | B65G 53/30 118/308 |
| 2018/0003305 A1* | 1/2018 | Gagne | ..................... | F16L 57/02 |
| 2019/0374963 A1* | 12/2019 | Mauchle | ............... | B65G 53/28 |
| 2022/0001403 A1* | 1/2022 | Tobler | .................. | B05B 5/1683 |
| 2022/0016653 A1* | 1/2022 | Tobler | .................. | B05B 7/1472 |
| 2022/0323977 A1* | 10/2022 | Mauchle | ............... | B65G 53/28 |
| 2024/0286155 A1* | 8/2024 | Sanwald | ............... | B65G 53/28 |
| 2024/0316582 A1* | 9/2024 | Sutter | .................. | B05B 7/1459 |

FOREIGN PATENT DOCUMENTS

| | | | | |
|---|---|---|---|---|
| DE | 202008015865 U1 | 2/2009 | | |
| DE | 102011004035 A1 | 8/2012 | | |
| DE | 102013211550 A1 | 12/2014 | | |
| DE | 102017103487 A1 | 8/2018 | | |
| DE | 102018204554 B3 | 4/2019 | | |
| DE | 102018222083 A1 * | 6/2020 | ............... | F16K 7/07 |
| DE | 112023000414 T5 | 9/2024 | | |
| EP | 1857384 A2 | 11/2007 | | |
| WO | 2004087331 A1 | 10/2004 | | |
| WO | 2008098603 A1 | 8/2008 | | |

OTHER PUBLICATIONS

International Search Report and Written Opinion dated Nov. 7, 2022, for corresponding PCT Application No. PCT/EP2022/068611.

International Preliminary Report on Patentability dated Jan. 18, 2024, for corresponding PCT Application No. PCT/EP2022/068611.

Communication pursuant to Article 94(3) EPC dated Mar. 25, 2025, received for European Patent Application No. 22741497.6-1004, 4 pgs.

* cited by examiner

DENSE-PHASE POWDER PUMP WITH PINCH VALVE AND PINCH VALVE

CROSS-REFERENCE TO RELATED APPLICATION(S)

This application is a U.S. National Stage Application of PCT International Application No. PCT/EP2022/068611, filed on Jul. 5, 2022, which claims priority to the German Patent Application No. 10 2021 117 797.9, filed on Jul. 9, 2021, which are incorporated herein by reference in their entireties.

BACKGROUND

The present disclosure relates to a dense phase powder pump.

Accordingly, the present disclosure relates in particular to a dense phase powder pump for conveying powder, particularly coating powder, wherein the dense phase powder pump comprises at least one powder conveying chamber having a (gas-permeable) filter element at least partially accommodated in a casing body or casing tube and at least one pinch valve connected or connectable to an end region of the powder conveying chamber.

In particular, the powder dense phase pump has a first pinch valve connected to the intake-side end region of the powder conveying chamber and a second pinch valve connected to the output-side end region of the powder conveying chamber. The powder conveying chamber has at least one connection for alternately applying positive pressure and negative pressure to the powder conveying chamber.

The principle of such a powder dense phase pump is known from the prior art. For example, printed publication EP 1 551 558 A1 describes a dense phase powder pump having a first powder conveying chamber and a second powder conveying chamber arranged parallel to the first powder conveying chamber. The powder conveying chambers of the pump known from this prior art are limited on both the intake side as well as the output side by a respective mechanically operated pinch valve arrangement.

It is thereby specifically provided for the powder hoses connected to the respective powder conveying chambers in the intake-side or output-side region of the powder pump to be deformable by a mechanical force so as to squeeze or open the hose section as necessary. The powder conveying chambers of the pump known from this prior art comprise a gas-permeable filter element. A negative pressure is generated in the powder conveying chamber via a vacuum connection, in consequence of which coating powder is drawn into the powder conveying chamber via the intake-side end region of the powder conveying chamber. The pinch valve provided at the intake-side end region of the powder conveying chamber is then closed and the pinch valve provided at the output-side end region of the powder conveying chamber is opened. When positive pressure is applied to the powder conveying chamber, the coating powder previously drawn into the powder conveying chamber is expelled again from the powder conveying chamber through the output-side end region.

This known prior art powder pump exhibits various disadvantages in practical use. In particular, the design proposed in this prior art makes it relatively difficult to replace a potentially clogged filter element or defective pinch valve. The solution known from this prior art particularly does not allow a filter element to be replaced without disrupting the pinch valve assembly. There is thus a risk of leaks developing after maintenance or filter element replacement and no longer being able to guarantee the reliable functioning of the powder pump.

Other known prior art dense phase powder pumps of the aforementioned type also have the disadvantage of only being able to be maintained with relatively great effort. In particular, replacing the pinch valves of the known dense phase powder pumps is a relatively complex process.

The intended task of the present disclosure is that of further developing a dense phase powder pump of the initially cited type to the effect of being able to replace or service it, or its components respectively, as easily as possible.

SUMMARY

On the basis of these problems, the present disclosure is thus based on the task of further developing a dense phase powder pump of the initially cited type such that it can be maintained with relatively little effort, whereby particularly a pinch valve of the dense phase powder pump can be easily replaced without the risk of compromising the dense phase powder pump's functionality.

Accordingly, the present disclosure relates in particular to a dense phase powder pump having a powder conveying chamber with a preferably cylindrical and in particular circular cylindrical casing tube and a gas-permeable filter element arranged inside the casing tube, wherein a first pinch valve connected to the intake-side end region of the powder conveying chamber and a second pinch valve connected to the output-side end region of the powder conveying chamber are furthermore provided. The powder chamber has at least one connection for alternately applying positive pressure and negative pressure to the powder conveying chamber.

The at least one first or second pinch valve comprises an at least partly tubular valve element, its peripheral wall able to be squeezed transversely to the valve element's longitudinal axis in order to change the sectional area of flow. The at least one pinch valve further comprises a preferably at least substantially tubular support structure in which the valve element is at least partially accommodated. The support structure consists of a plurality of shell elements of arcuate cross section circumferentially aligned one after the other around the peripheral wall which are radially positioned externally of the valve element relative to the longitudinal axis of the valve element.

Providing the support structure ensures that the valve element can be easily installed without compromising its retention. The assembly of the pinch valve produces a cartridge-like or canister-like structural unit, as a result of which there is no need for laboriously inserting the valve element into a support structure. Instead, the individual shell elements of the support structure can be radially positioned externally of the tubular valve element in order to form the circumferentially segmented support structure. It still remains possible to axially insert the cartridge-like or canister-like structural unit composed of the shell elements and the valve element into a valve housing and also remove it again when needed. The segmentation of the support structure with the detachable mounting of the shell elements provides the advantage of being able to easily replace a worn valve element while the shell elements remain reusable.

According to further developments of the present disclosure, the support structure consists of exactly two shell elements, each having a respective arcuate extension of 180°. These are in particular identical components so as to enable economical production.

The two shell elements preferably have at least one first latching means and at least one second latching means of complementary design to the first latching means, via which the two shell elements can be positively and in particular releasably connected together to form the support structure. The latching means are in particular latching means which enable a clip connection to be formed.

In a further development of the latter aspect, the at least one first latching means and the at least one second latching means are formed on the two shell elements such that the two shell elements can only be connected together in one prespecified orientation. This alignment of the at least one first latching means and the at least one second latching means provides a measure for the immediate detection or respectively prevention of errors, particularly pursuant to the poka-yoke principle.

Preferably provided in the dense phase powder pump according to the present disclosure, at least when the shell elements are in an interconnected state, is for the support structure to exhibit an in particular slotted opening through which compressed air can act as a squeezing means on the valve element's peripheral wall in order to squeeze the peripheral wall of the valve element so as to reduce the given sectional area of flow. Implementations thereby provide for the at least one preferably slotted opening to be formed in an area between the two shell elements during the assembly of the cartridge-like or canister-like structural unit.

Implementations of the disclosed dense phase powder pump provide for the plurality of shell elements to each be connected to one another via a respective integral hinge area. This simplifies the handling and assembly of the pinch valve. Moreover, this embodiment allows forming the shell elements in a single injection molding process. Of course, other embodiments are also conceivable.

Particularly when the accommodating channel of the support structure and/or the peripheral wall of the valve element has a non-circular cross-sectional contour, it is advisable for position setting means to be realized on the shell elements on the one hand and on the valve element on the other which positively interlock upon the positioning of the shell elements such that these components assume a predetermined relative position between themselves in the circumferential direction of the valve element longitudinal axis.

This is particularly advantageous when the accommodating channel of the support structure and/or the peripheral wall has an elongated cross section so that mutual alignment of the rotational position is advantageous. The elongated cross-sectional shape of the peripheral wall has the advantage of squeezing occurring in a preferred direction transverse to the cross-sectional longitudinal axis when external fluid acts on the valve element's peripheral wall. The sectional area of flow can thereby be blocked particularly reliably.

Embodiments of the disclosed dense phase powder pump provide for the shell elements to be overdimensioned in the axial direction with respect to the clearance between two end-side flange sections of the flexible valve element. In so doing, the peripheral wall of the valve element is axially stretched during the assembling of the cartridge-like or canister-like structural unit, which results in a radially outward oriented pretensioning of the peripheral wall so that the expansion of the peripheral wall is supported when no external pressure forces are currently being exerted on the valve element's peripheral wall.

For example, it is conceivable for the valve element to have a radially projecting flange area on at least one of its two end regions and preferably on both end regions, whereby the support structure is axially arranged between the two end regions of the valve element and frontally flanked by them.

In order to easily secure the shell elements to the outer periphery of the valve element, a retaining body enclosing the segmented support structure is preferably provided. This is in particular a separate component with respect to a valve housing which can also be a component of the cartridge-like or canister-like structural unit. One expedient configuration is as a retaining tube coaxially enclosing the support structure which can be easily attached once the shell elements have been positioned on the valve element.

The retaining body—like the support structure—can have at least one radial through hole for squeezing means (in particular compressed air) acting on the peripheral wall of the valve element.

So as to be able to connect the pinch valve to the powder conveying chamber of the dense phase powder pump as easily as possible, implementations of the disclosed dense phase powder pump provide for it to further comprise a pinch valve housing arranged on the at least one end region of the powder conveying chamber which is or is able to be detachably connected to the end region of the powder conveying chamber. The pinch valve housing is designed such that the pinch valve can at least in part be replaceably accommodated in the pinch valve housing.

The pinch valve housing comprises a connection for supplying squeezing means to the pinch valve housing, in particular compressed air, to actuate the pinch valve.

Embodiments of the disclosed dense phase powder pump provide for the pinch valve housing to have a first region for the in particular replaceable accommodation of the pinch valve and an oppositely disposed second region, wherein these regions are connected together via a powder conveying channel. The pinch valve housing is connectable to the casing body of the powder conveying chamber, in particular able to plug into same, via the second region of the pinch valve housing. This enables the pinch valve housing to be easily removed from the powder conveying chamber, for example in order to replace or inspect the powder conveying chamber's filter element. In like manner, the pinch valve is able to connect to the casing body of the powder conveying chamber easily and with a tight seal.

The pinch valve housing is preferably a component able to be detachably or replaceably connected to the casing body of the powder conveying chamber, in particular via a plug connection.

The second region of the pinch valve housing is preferably further designed to accommodate an end region of the filter element of the powder conveying chamber. This enables optimal sealing to be realized.

In order to achieve the dense phase powder pump being of the most compact possible structure while at the same time preventing undercuts or edges in which powder can accumulate, it is provided for the support structure to have a radial and mean outer diameter vis-à-vis the valve element longitudinal axis which at least substantially corresponds to the radial and mean inner diameter of the filter element vis-à-vis the filter element longitudinal axis. In particular, the mean outer diameter of the support structure should preferably differ from the mean inner diameter of the filter element by less than 10% and even more preferentially by less than 5%.

The present disclosure further relates to a pinch valve, in particular for a dense phase powder pump of the above-described type, wherein the pinch valve comprises an at least partly tubular valve element, its peripheral wall able to be squeezed transversely to the valve element's longitudinal axis in order to change the sectional area of flow. The pinch valve further has a preferably at least substantially tubular support structure in which the valve element is at least partially accommodated, wherein the support structure consists of a plurality of shell elements of arcuate cross section circumferentially aligned one after the other around the peripheral wall which are radially positioned externally of the valve element relative to the longitudinal axis of the valve element.

The pinch valve according to the present disclosure is in particular implemented as a cartridge-like or canister-like component which is or can be replaceably accommodated as such in a pinch valve housing.

BRIEF DESCRIPTION OF THE DRAWINGS

The following will reference the accompanying drawings in describing an exemplary embodiment of the present disclosure in greater detail.

Shown are.

DETAILED DESCRIPTION

Figure 1:
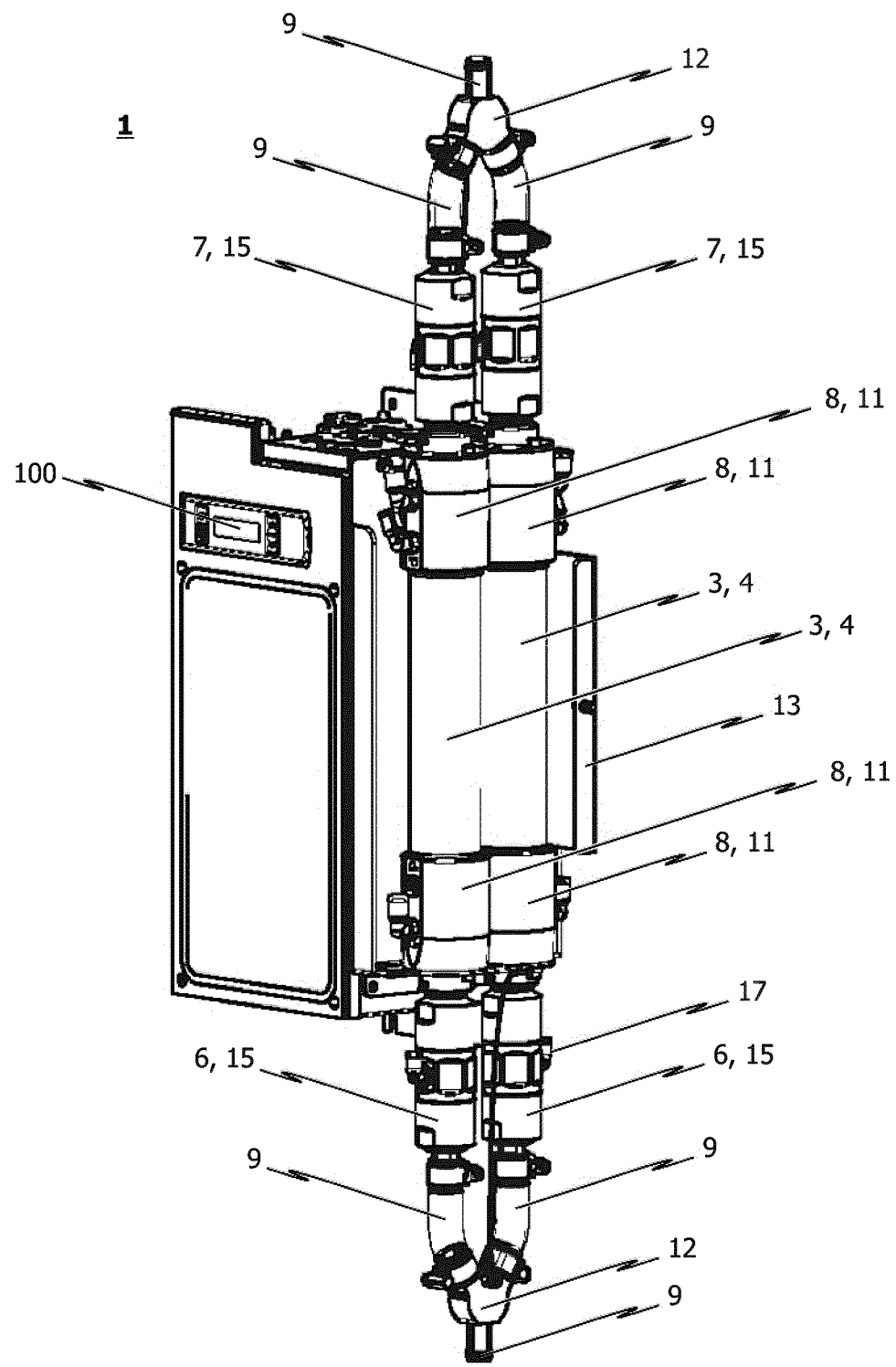
FIG. 1 a schematic and isometric view of an exemplary embodiment of the disclosed dense phase powder pump having two parallelly arranged powder conveying chambers.

The following will reference the drawings in describing the structure and mode of operation of a dense phase powder pump 1 according to an exemplary embodiment of the present disclosure. The exemplary embodiment of the disclosed dense phase powder pump makes use of two powder conveying chambers 2, 2' arranged parallel to one another.

Each of the two parallelly arranged powder conveying chambers 2, 2' exhibits an in particular cylindrical main body region 3 having an at least substantially uniform effective sectional area of flow. Each particularly cylindrical main body region 3 of the two powder conveying chambers 2, 2' has a cylindrical, in particular circular cylindrical, casing tube 4 and a filter element 5 accommodated in the interior of the casing tube 4. The filter element 5 of the main body region 3 of the powder conveying chamber 2, 2' is in particular a cylindrical filter element 5.

Each powder conveying chamber 2, 2' has a powder inlet with a powder inlet valve 6 and a powder outlet with a powder outlet valve 7. The respective powder inlet valves 6 are also referred to as "first valves" or "intake-side valves" in the following. The powder outlet valves 7 are also referred to as "second valves" or "output-side valves."

The respective intake-side and output-side end regions of the main body regions of the powder conveying chambers 2, 2' have a transition region 8 which is designed to reduce an effective sectional area of flow of the powder conveying chamber 2, 2' to an effective sectional area of flow of the respective connected powder line 9 or to reduce the effective sectional area of flow of the valve 6, 7 arranged between the powder conveying chamber 2, 2' and the powder line 9 respectively. The transition region 8 is thereby in particular at least in part implemented as a conical region.

The transition regions 8 serve to adapt/reduce the nominal width of the main body region 3 of the powder conveying chamber 2, 2'; i.e. the inner diameter of the main body region 3 of the powder conveying chamber 2, 2', to the nominal width of the respective connected powder line 9 or the nominal width of the intervening valve 6, 7 respectively.

The transition regions 8 comprise an in particular conical filter element 10 accommodated in a filter housing 11.

A vacuum (negative pressure) is generated in one of the powder conveying chambers 2, 2' of the dense phase powder pump 1 during an intake process. The negative pressure draws the powder to be conveyed, in particular coating powder, into the powder conveying chamber 2, 2' via the corresponding powder inlet. The fine porous filter element 5 in the main body region 3 of the powder conveying chamber 2, 2' separates the powder. During the intake process, the powder conveying chamber 2, 2' is closed on the respective intake side or output side by the corresponding output-side valve.

During the conveying process, on the other hand, the intake-side valve 6 on the powder inlet side of the powder conveying chamber 2, 2' is closed while the output-side valve 7 is opened. The coating powder previously drawn into the powder conveying chamber 2, 2' during the intake process is then forced out of the powder conveying chamber 2, 2' and conveyed further via the positive pressure built up with the compressed air through the fine porous filter element 5 of the main body region 3.

The intake and conveying process are alternated between the two parallelly arranged powder conveying chambers 2, 2'. In other words, the two parallelly arranged powder conveying chambers 2, 2' operate in phase opposition.

FIG. 1 shows the structure of a dense phase powder pump 1 having two parallelly arranged powder conveying chambers 2, 2' according to an exemplary embodiment of the present disclosure in an isometric view. The dense phase powder pump 1 has two powder conveying chambers 2, 2', wherein each of the two powder conveying chambers 2, 2' exhibit a cylindrical main body region 3 having a cylindrical and in particular circular cylindrical casing tube 4 and a gas-permeable filter element 5 arranged inside the casing tube 4. The filter element 5 is preferably a rigid body made from sintered material, preferably sintered metal, e.g. bronze or aluminum, or from sintered plastic or a sintered material mixture.

Figure 2:
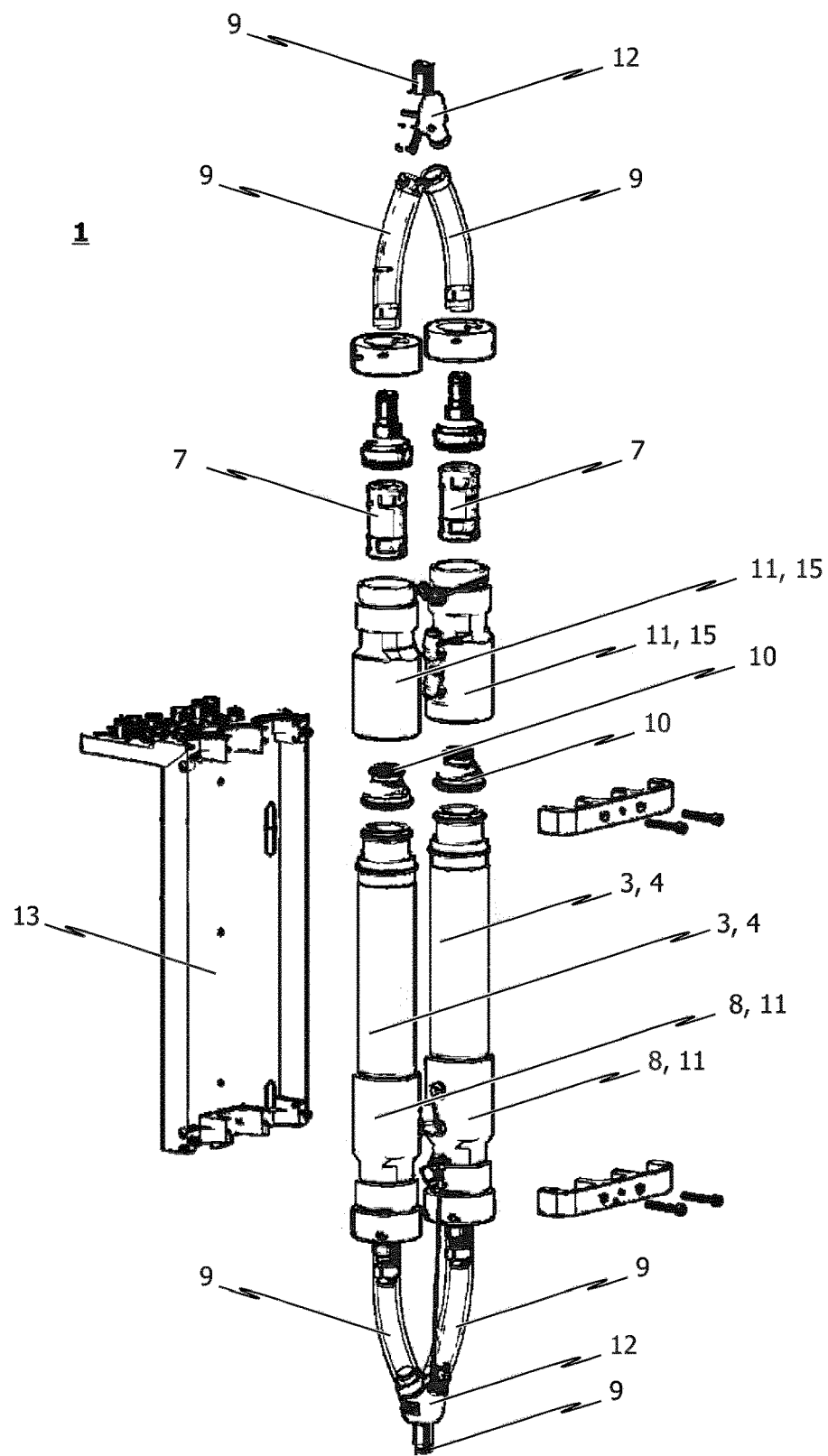
FIG. 2 a schematic and exploded view of the exemplary embodiment of the disclosed dense phase powder pump shown in FIG. 1.

As can be seen in particular from the exploded view shown in FIG. 2, the main body region 3 of each powder conveying chamber 2, 2' has a transition region 8 at the intake and output sides which is detachably connected or connectable to the main body region 3 and a part of the powder conveying chamber 2, 2'. The transition region 8 thereby serves to adapt/reduce the nominal width of the main body region 3 of the powder conveying chamber 2, 2' to the nominal width of an intake-side or output-side valve 6, 7.

In order to accordingly reduce the nominal width; i.e. the inner diameter of the cylindrical main body region 3 of the powder conveying chamber 2, 2', to the (reduced) nominal width of the corresponding valve 6, 7 or corresponding powder line 9 respectively, each transition region 8 comprises a filter element 10 which in particular tapers conically in the direction of the valve 6, 7 or the flow line.

The filter element 10 is—as is the filter element 5 of the main body region 3—preferably a rigid body made in particular from sintered material, preferably sintered metal, e.g. bronze or aluminum, or from sintered plastic or a sintered material mixture. Of course, other embodiments for the filter element 10 of the transition region 8 conically tapering in the direction of the respective valve 6, 7 are also conceivable.

The filter element 10 conically tapering in the direction of the respective valve 6, 7 defines the effective sectional area of flow of the transition region 8 in order to accordingly adapt the nominal width of the main body region 3 of the powder conveying chamber 2, 2' to the nominal width of the valve 6, 7 connected to the respective end region of the powder conveying chamber 2, 2'.

As can be seen from the exploded view in FIG. 2, the respective conically tapering filter element 10 of the transition region 8 is detachably connected to the corresponding end region of the main body region 3 of the powder conveying chamber 2, 2', particularly by means of a screw coupling or other releasable connection, for example using a bayonet coupling or fixable plug connection.

Each transition region 8 further exhibits a corresponding filter housing 11 in which the conically tapering filter element 10 can be accommodated. An air gap is formed between the interior area of the filter housing 11 and the exterior area of the conically tapering filter element 10 which is able to be pressurized as needed via a corresponding air line.

A first pinch valve 6 connected to the intake-side end region of the powder conveying chamber 2, 2' is provided at the powder inlet of each powder conveying chamber 2, 2' of the dense phase powder pump 1 shown schematically in FIG. 1 and FIG. 2. A second pinch valve 7 is connected to the respective output-side end region of the powder conveying chamber 2, 2'; i.e. to the output-side end region of the transition region 8 of the powder conveying chamber 2, 2'.

In the depicted embodiment, supply line branches of a Y-connector 12 connect the powder inlet side of the two first (intake-side) valves 6 to a powder supply line 9 leading to a container of powder, for example (not depicted in the drawings). Hose couplings are thereby used to connect the powder inlet side of the two first valves 6 (pinch valves) to the supply line branches of the Y-connector 12.

However, it is also conceivable for the respective powder inlet sides of the first (intake side) valves/pinch valves 6 to be fluidly connected to one or two different powder containers via separate powder supply lines instead of a Y-connector 12.

In the embodiment as depicted, dispensing line branches, e.g. likewise a Y-shaped line connector 12, connect the powder outlets of the two second (output side) valve/pinch valves 7 to one end of a powder dispensing hose 9, the other end of which opens into a further (not depicted) container of powder. While the powder dispensing line can be a rigid tubing, it is preferably a flexible hose.

In the embodiment depicted in FIG. 1 and FIG. 2, each of the powder conveying chambers 2, 2' are accommodated and fixed in a holder 13. The powder conveying chambers 2, 2' are in particular connected to the holder 13 by means of a disengageable screw or bayonet coupling.

In the exemplary embodiment of the disclosed dense phase powder pump 1 shown in the drawings, each first and second valve 6, 7 is designed as a pinch valve, whereby each pinch valve 6, 7 is allocated an elastically deformable valve element 14 which is arranged inside a corresponding pinch valve housing 15 such that the inlet of the pinch valve 6, 7 can be brought into fluid communication with the outlet of the pinch valve 6, 7 by the valve element formed as an elastically deformable valve element 14.

The pinch valve housing 15 comprises a connection 17 in order to supply compressed air as needed into the space formed between the inner wall of the pinch valve housing 15 and the valve element 14 arranged inside the pinch valve housing 15. Upon compressed air being supplied, the valve element 14 is elastically deformed so as to interrupt the fluid communication between the inlet and the outlet of the pinch valve 6, 7. However, when there is no compressed air in the gap between the inner wall of the pinch valve housing 15 and the valve element 14 arranged inside the pinch valve housing 15, the previously elastically deformed valve element 14 returns to its initial state with the inlet and the outlet of the pinch valve housing 15 being in fluid communication.

A vacuum connection can also be connected via the at least one connection of the pinch valve 6, 7 for evacuating the compressed air previously introduced into the gap in order to rapidly open the pinch valve.

Figure 4:
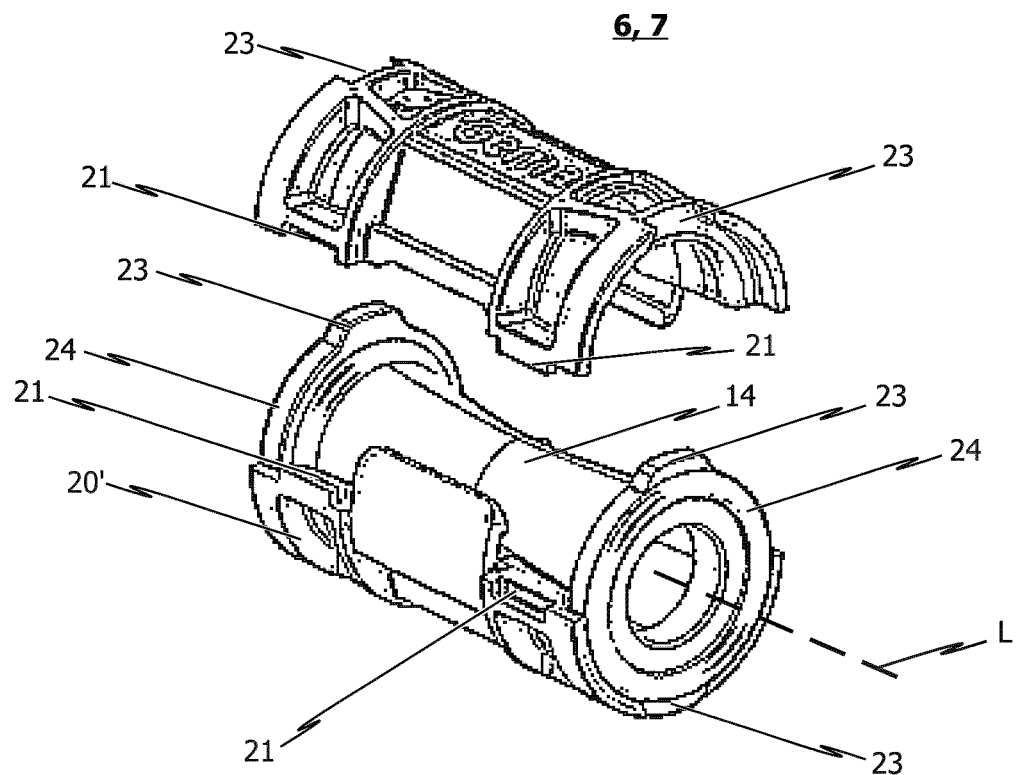
FIG. 4 a schematic and exploded view of a pinch valve of the dense phase powder pump according to FIG. 1.
Figure 5:
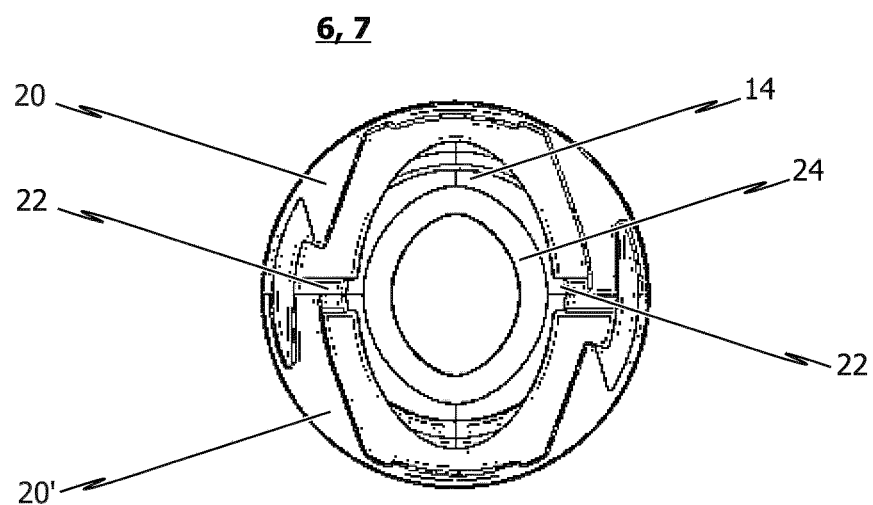
FIG. 5 a schematic and frontal view of the pinch valve according to FIG. 4 in the assembled state.

The following will reference the depictions provided in particular in FIG. 4 and FIG. 5 in describing the configuration of the pinch valve 6, 7 used in the disclosed dense phase powder pump 1 in greater detail.

As depicted, the pinch valve 6, 7 comprises an at least partly tubular valve element 14, the peripheral wall of which can be squeezed transversely to the valve element's longitudinal axis L in order to change the sectional area of flow.

The pinch valve 6, 7 further comprises an at least substantially tubular support structure 19 in which the valve element 14 is at least partially accommodated. The support structure 19 consists of two shell elements 20, 20' of arcuate cross section circumferentially aligned one after the other around the peripheral wall of the valve element 14 which are radially positioned externally of the valve element 14 relative to the valve element's longitudinal axis L.

Each of the two shell elements 20, 20' of the support structure 19 exhibit an arcuate extension of 180°. Furthermore, the two shell elements 20, 20' have first and second latching means 21 by means of which the two shell elements 20, 20' can be connected together in a positive and in particular releasable fit to form the support structure 19.

As can be seen in particular from the FIG. 5 representation, the support structure 19 has slotted openings 22 through which compressed air can act as a squeezing means on the peripheral wall of the valve element 14, at least in the connected state of the shell elements 20, 20', in order to squeeze the peripheral wall of the valve element 14 together to reduce the given sectional area of flow.

The exploded view according to FIG. 4 shows positively interlocking position setting means 23 arranged on the shell elements 20, 20' and the valve element 14 which are designed to specify a circumferential position of the shell elements 20, 20' that is or is to be assumed in the circumferential direction relative to the valve element 14.

The valve element 14 has a radially protruding flange area 24 at both of its two end regions. The support structure 19 is axially arranged between the two end regions of the valve element 14 and flanked by them at the front.

Returning to the FIG. 1, FIG. 2 and FIG. 3 depictions, it is to be noted that the dense phase powder pump 1 has a pinch valve housing 15 arranged at the respective end regions of the powder conveying chamber 2, 2' which is or is able to be detachably connected to the corresponding end region of the powder conveying chamber 2, 2'. The respective pinch valve housing 15 is designed to replaceably accommodate the pinch valve 6, 7 implemented as a cartridge-like or canister-like component.

Figure 3:
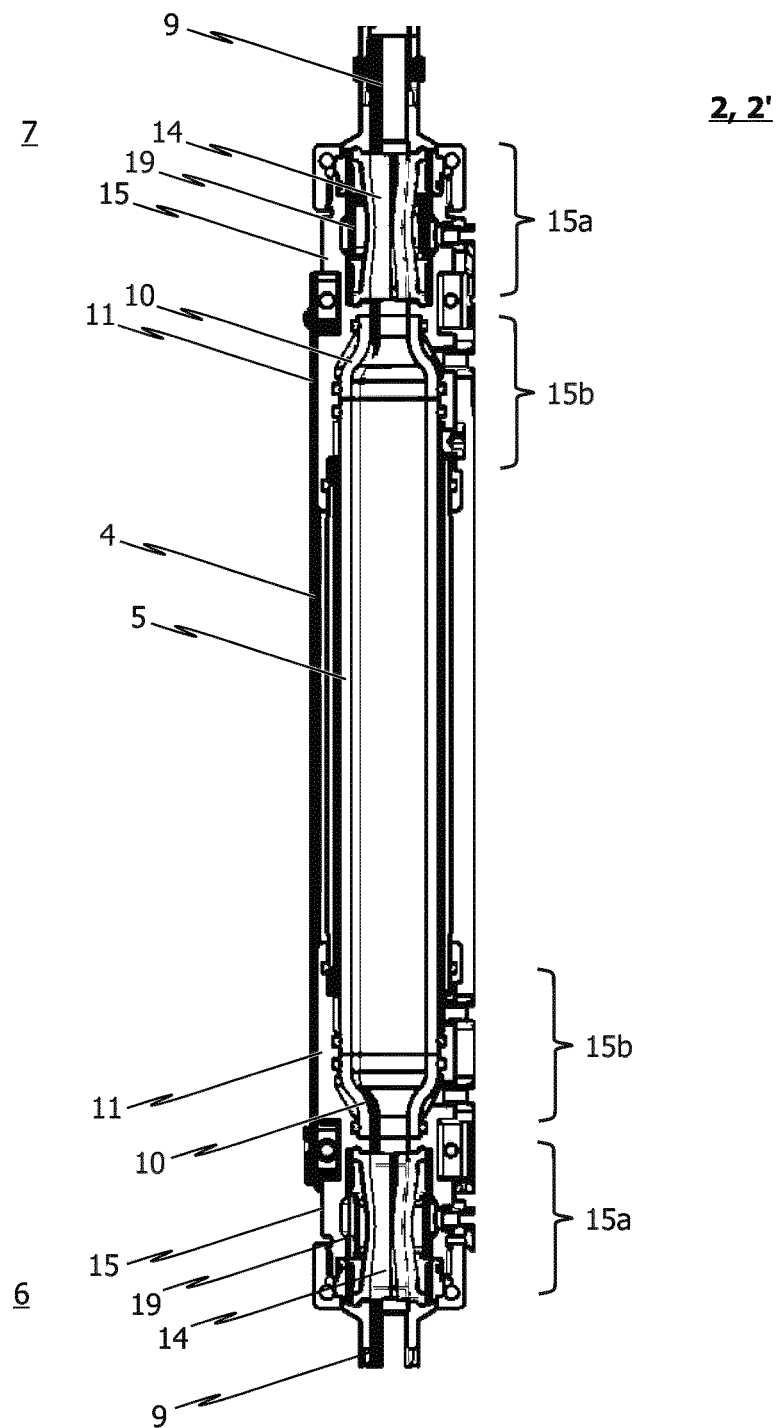
FIG. 3 a schematic and sectional view of a powder conveying chamber of the dense phase powder pump according to FIG. 1.

It can be seen from the sectional view in FIG. 3 that the pinch valve housing 15 has a first region 15a for the in particular replaceable accommodation of the pinch valve 6, 7 and an oppositely disposed second region 15b, via which the pinch valve housing 15 is connectable to the casing body 4 of the powder conveying chamber 2, 2', in particular able to plug into it. The pinch valve housing 15 is in particular a component which is able to be detachably or replaceably connected to the casing body 4 of the powder conveying chamber 2, 2'.

The second region 15b of the pinch valve housing 15 is designed to accommodate an end region of the filter element 5 of the powder conveying chamber 2, 2'.

In the exemplary embodiment of the disclosed dense phase powder pump 1 depicted in the drawings, it is specifically provided for the support structure 19 of the pinch valve 6, 7 to have a radial and mean outer diameter vis-à-vis the valve element longitudinal axis L which at least substantially corresponds to the radial and mean inner diameter of the filter element 5 vis-à-vis the valve element longitudinal axis, wherein the mean outer diameter of the support structure 19 preferably differs from the mean inner diameter of the filter element by less than 10% and even more preferentially by less than 5%.

The pinch valve 6, 7 is in particular designed as a cartridge-like or canister-like component which is or is able to be replaceably accommodated as such in a pinch valve housing 15 of the dense phase powder pump 1. The pinch valve housing 15 encloses an accommodating space. The pinch valve housing 15 preferentially has a first tubular region 15a and a second region 15b connected to the first region 15a via a fluid channel or powder conveying channel. The pinch valve housing 15 is detachably connected to the powder conveying chamber 2, 2'. It is provided with a fluid connection formed by an axial passageway. Pressurizing means controlling the pinch valve 6, 7 can be introduced via the fluid connection.

The present disclosure is not limited to the embodiments depicted in the drawings but rather yields from an integrated overall consideration of all the features as disclosed herein.

LIST OF REFERENCE NUMERALS 1 dense phase powder pump
2, 2' powder conveying chamber
3 main body region
4 casing tube
5 filter element
6 powder inlet valve
7 powder outlet valve
8 transition region
9 powder line
10 conical filter element
11 filter housing
12 Y-connector
13 holder
14 valve element (pinch valve)
15 pinch valve housing
15a first region of pinch valve housing
15b second region of pinch valve housing
17 connection on pinch valve housing
19 support structure
20, 20' shell element
21 latching means
22 opening
23 position setting means
24 flange area
L valve element longitudinal axis

The invention claimed is:

1. A dense phase powder pump for conveying powder, wherein the dense phase powder pump comprises at least one powder conveying chamber having a filter element at least partially accommodated in a casing body and at least one pinch valve connected or connectable to an end region of the powder conveying chamber, wherein:
   the pinch valve comprises an at least partly tubular valve element, a peripheral wall thereof being able to be squeezed transversely to a longitudinal axis of the valve element in order to change the sectional area of flow, and further comprises an at least substantially tubular support structure in which the valve element is at least partially accommodated, wherein the support structure consists of a plurality of shell elements of arcuate cross section circumferentially aligned one after the other around the peripheral wall of the valve element and are radially positioned externally of the valve element relative to the longitudinal axis of the valve element,
   the dense phase powder pump further comprises a pinch valve housing arranged on the end region of the powder conveying chamber and detachably connected to the end region of the powder conveying chamber, and designed such that the pinch valve can at least in part be replaceably accommodated in the pinch valve housing, and
   the pinch valve housing has a first region for replaceable accommodation of the pinch valve and an oppositely disposed second region via which the pinch valve housing is connectable to and able to plug into the casing body of the powder conveying chamber.

2. The dense phase powder pump according to claim 1, wherein the support structure consists of exactly two shell elements, each having a respective arcuate extension of 180°, wherein the two shell elements have at least one first latching means and at least one second latching means of complementary design to the first latching means via which the two shell elements can be positively and releasably connected together to form the support structure.

3. The dense phase powder pump according to claim 2, wherein the at least one first latching means and the at least one second latching means are formed on the two shell elements pursuant to the poka-yoke principle such that the two shell elements can only be connected together in one prespecified orientation.

4. The dense phase powder pump according to claim 1, wherein at least when the shell elements are in an interconnected state, the support structure exhibits an opening through which compressed air can act as a squeezing means on the peripheral wall of the valve element in order to squeeze the peripheral wall of the valve element so as to reduce the sectional area of flow.

5. The dense phase powder pump according to claim 1, wherein the plurality of shell elements are each connected to one another via a respective integral hinge area.

6. The dense phase powder pump according to claim 1, wherein positively interlocking position setting means are arranged on at least one shell element and the valve element which are designed to specify a circumferential position of the shell elements that is in a circumferential direction relative to the valve element.

7. The dense phase powder pump according to claim 1, wherein the valve element exhibits a radially projecting flange area on at least one of its two end regions, wherein the support structure is axially arranged between the two end regions of the valve element.

8. The dense phase powder pump according to claim 1, wherein the pinch valve housing is a component able to be detachably or replaceably connected to the casing body of the powder conveying chamber.

9. The dense phase powder pump according to claim 1, wherein the pinch valve is implemented as a cartridge or canister component which is or can be replaceably accommodated in the pinch valve housing.

10. The dense phase powder pump according to claim 1, wherein a second region of the pinch valve housing opposite the first region of the pinch valve housing is designed to accommodate an end region of the filter element of the powder conveying chamber.

11. The dense phase powder pump according to claim 10, wherein the support structure has a radial and mean outer diameter in relation to the longitudinal axis of the valve element which at least substantially corresponds to a radial and mean inner diameter of the filter element in relation to a longitudinal axis of the filter element, wherein the radial and mean outer diameter of the support structure differs from the radial and mean inner diameter of the filter element by less than 10%.

\* \* \* \* \*